(12) United States Patent
Martin et al.

(10) Patent No.: US 9,873,350 B2
(45) Date of Patent: Jan. 23, 2018

(54) HYBRID VEHICLE AND METHOD OF CONDITIONING A VEHICLE BATTERY

(71) Applicant: FORD GLOBAL TECHNOLOGIES, LLC, Dearborn, MI (US)

(72) Inventors: Douglas Raymond Martin, Canton, MI (US); Thomas G. Leone, Ypsilanti, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 14/855,981

(22) Filed: Sep. 16, 2015

(65) Prior Publication Data

US 2017/0072813 A1 Mar. 16, 2017

(51) Int. Cl.
| | |
|---|---|
| *B60L 11/18* | (2006.01) |
| *H01M 10/613* | (2014.01) |
| *H01M 10/625* | (2014.01) |
| *H01M 10/46* | (2006.01) |
| *H01M 10/48* | (2006.01) |
| *H01M 10/633* | (2014.01) |

(52) U.S. Cl.
CPC ....... *B60L 11/1874* (2013.01); *B60L 11/1809* (2013.01); *B60L 11/1875* (2013.01); *H01M 10/46* (2013.01); *H01M 10/486* (2013.01); *H01M 10/613* (2015.04); *H01M 10/625* (2015.04); *H01M 10/633* (2015.04); *H01M 2220/20* (2013.01)

(58) Field of Classification Search
CPC .............. B60L 11/1874; B60L 11/1809; B60L 11/1875; B60L 3/0046; H01M 10/613; H01M 10/625; H01M 10/633; H01M 10/46; H01M 10/486; H01M 2220/20
USPC ........................................................ 307/10.7
See application file for complete search history.

(56) References Cited

U.S. PATENT DOCUMENTS

| | | |
|---|---|---|
| 5,291,960 A | 3/1994 | Brandenburg et al. |
| 2010/0079115 A1* | 4/2010 | Lubawy .................... B60L 7/10 320/150 |
| 2014/0015450 A1 | 1/2014 | Momcilovich et al. |
| 2014/0076875 A1 | 3/2014 | Gale et al. |

FOREIGN PATENT DOCUMENTS

GB 2487552 B 8/2012

* cited by examiner

*Primary Examiner* — Hal Kaplan
(74) *Attorney, Agent, or Firm* — David Kelley; Brooks Kushman P.C.

(57) ABSTRACT

A includes a battery, an electric machine, an electrically powered cooling system, and a controller. The electric machine is configured to charge the battery with current generated from regenerative braking. The electrically powered cooling system is configured to cool the battery. The controller is programmed to, in response to a temperature of the battery being greater than a threshold, direct at least a portion of the current generated from regenerative braking to the cooling system.

16 Claims, 6 Drawing Sheets

HYBRID VEHICLE AND METHOD OF CONDITIONING A VEHICLE BATTERY

TECHNICAL FIELD

The present disclosure relates to hybrid vehicles and methods of redirecting regenerative braking power in order to condition the battery temperature of a hybrid vehicle.

BACKGROUND

The rate at which a battery may receive electrical charge during a recharging operation depends on several factors including the temperature of the battery.

SUMMARY

A vehicle includes a battery, an electric machine, an electrically powered cooling system, and a controller. The electric machine is configured to charge the battery with current generated from regenerative braking. The electrically powered cooling system is configured to cool the battery. The controller is programmed to, in response to a temperature of the battery being greater than a threshold, direct at least a portion of the current generated from regenerative braking to the cooling system.

A vehicle includes a battery, an electric machine, an electric heater, and a controller. The electric machine is configured to charge the battery with current generated from regenerative braking. The electric heater is configured to heat the battery. The controller is programmed to, in response to a temperature of the battery being less than a threshold, direct at least a portion of the current generated from regenerative braking to the electric heater.

A vehicle battery temperature controller includes an input channel configured to receive a signal indicative of battery temperature, and an output channel configured to provide a command to direct current generated via regenerative braking to an electrically powered battery temperature conditioning system. The controller also includes control logic to generate the command in response to the battery temperature traversing a desired battery temperature threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
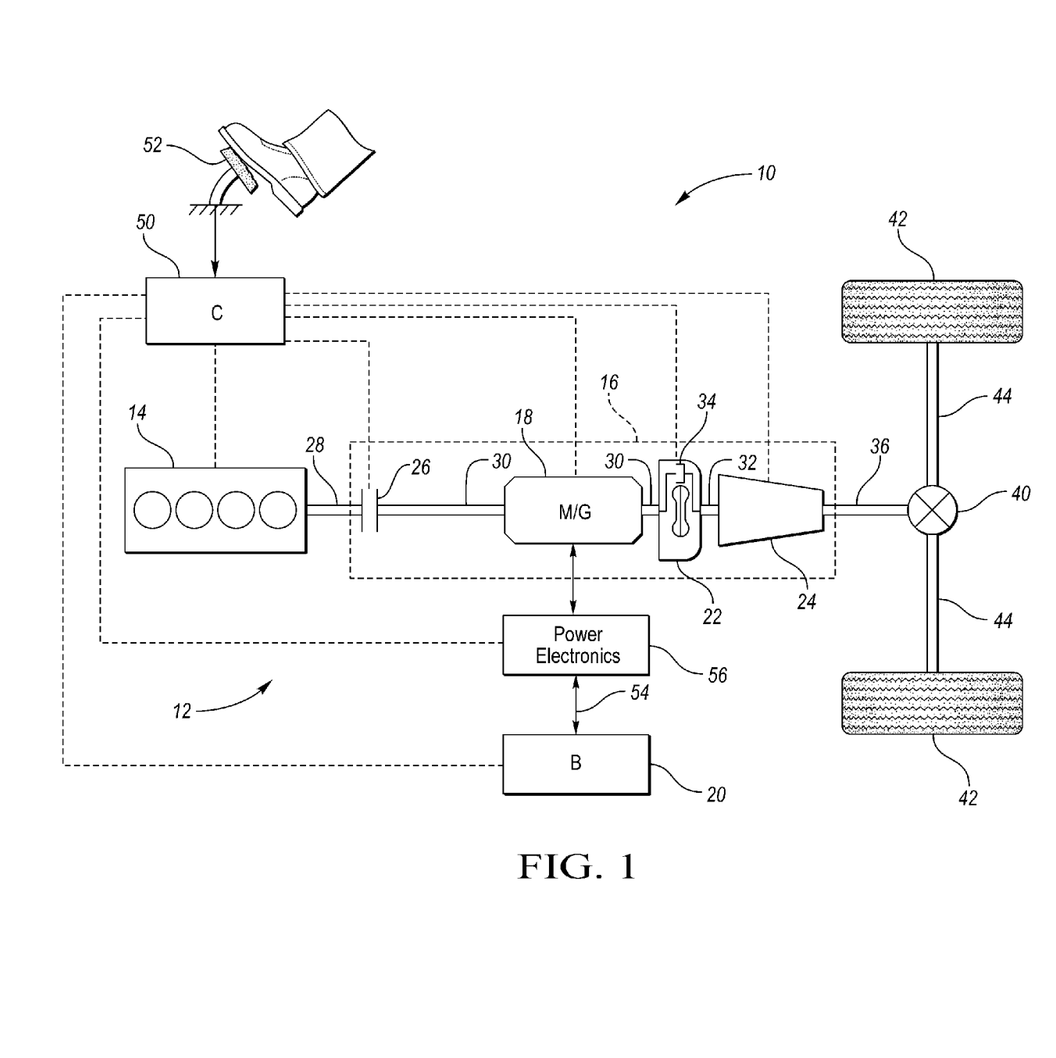
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
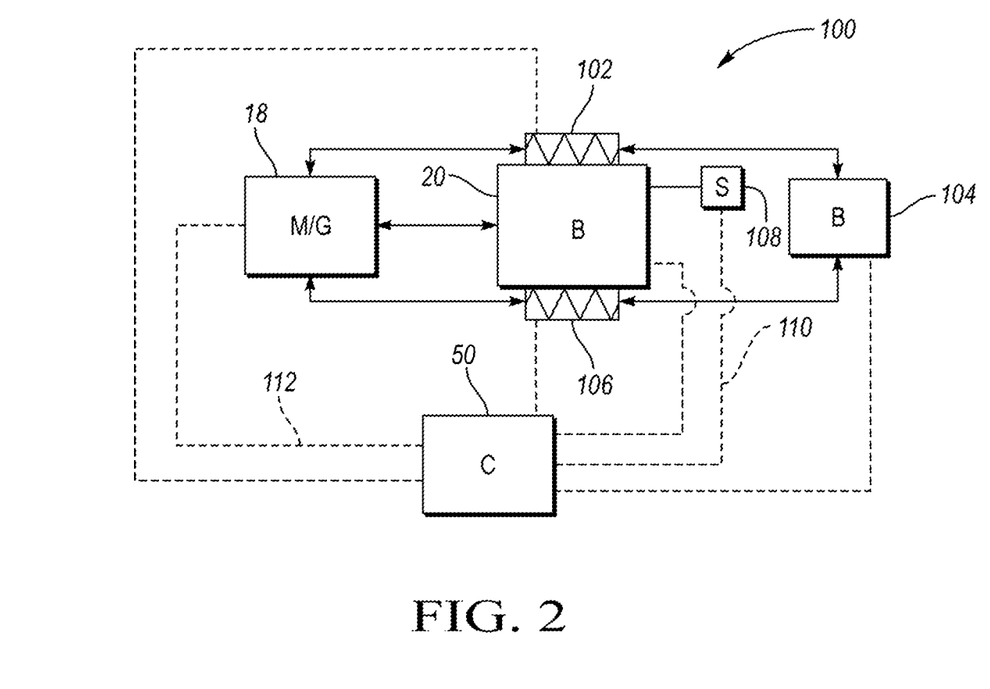
FIG. 2 is a schematic illustration of a first embodiment of an exemplary heating and cooling system of a battery in a hybrid electric vehicle.

Referring to FIG. 2, a schematic diagram of a first embodiment of an exemplary heating and cooling system 100 of a battery in a hybrid electric vehicle is illustrated. The heating and cooling system 100 may also be referred to as an electrically powered battery temperature conditioning system. The heating portion of the system 100 (which may be referred to solely as an electrically powered heating system) may include an electric heater 102 that is configured to transfer heat to the traction battery 20. The electric heater 102 may be any type of electric heater including heaters having resistance heating elements, immersion heaters, and positive temperature coefficient (PTC) heaters. The electric heater 102 may receive power via electrical wiring from the traction battery 20, an accessory battery 104 (such as a 12 V battery commonly found in automobiles), an alternator (not shown), the M/G 18, or any other power source that may be included in the HEV 10. The electric heater 102 may be configured to accept AC and/or DC electrical power. An AC to DC converter may be included if the electric heater 102 is configured to operate only on DC electrical power and the power source (e.g., alternator or M/G 18) is configured to generate AC electrical power. A DC to AC converter may be included if the electric heater 102 is configured to operate only on AC electrical power and the power source (e.g., battery) is configured to generate DC electrical power.

The cooling portion of the system 100 (which may be referred to solely as an electrically powered cooling system) may include a thermoelectric cooler 106. The thermoelectric cooler 106 may receive power via electrical wiring from the traction battery 20, the accessory battery 104, the alternator, the M/G 18, or any other power source that may be included in the HEV 10. The thermoelectric cooler 106 may be configured to accept AC and/or DC electrical power. An AC to DC converter may be included if the thermoelectric cooler 106 is configured to operate only on DC electrical power and the power source is configured to generate AC electrical power. A DC to AC converter may be included if the thermoelectric cooler 106 is configured to operate only on AC electrical power and the power source is configured to generate DC electrical power.

The controller 50 may also be in communication with the traction battery 20, accessory battery 104, M/G 18, alternator, or any other power source that may be utilized to power the electric heater 102 or thermoelectric cooler 106. The controller 50 may coordinate which power source will be utilized to power the electric heater 102 or the thermoelectric cooler 106. For example, the traction battery 20 may be used to power the electric heater 102 or thermoelectric cooler 106 if the traction battery 20 is sufficiently charged, the accessory battery 104 may be used to power the electric heater 102 or thermoelectric cooler 106 if the accessory battery 104 is sufficiently charged, the M/G 18 may be used to power the electric heater 102 or thermoelectric cooler 106 if the M/G 18 is operating as a generator, or the alternator may be used to power the electric heater 102 or thermoelectric cooler 106.

The controller 50 may also be in communication with a series of sensors that are configured to communicate to the controller 50 certain conditions of the HEV 10 or the surrounding environment. A temperature sensor 108 may be configured to communicate the temperature of the traction battery 20 to the controller 50. The ability of a battery to receive charge (including the rate at which the battery may receive charge and the total amount of charge the battery may receive) may increase when the battery temperature is within an optimal or desired temperature range. The optimal temperature range may be between 20° F. and 120° F. A more concentrated optimal temperature range may be between 68° F. and 72° F. The most optimized temperature allows for the highest state of current flow to the battery. In order to maintain an optimal battery temperature, the controller 50 may act a vehicle battery temperature controller and be configured to activate the electric heater 102 or the thermoelectric cooler 106 to adjust the temperature of the traction battery 20 so that it is within the optimal temperature range when excess regenerative braking energy is present. The controller 50 may include an input channel 110 configured to receive a signal from the temperature sensor 108 indicative of the temperature of the traction battery 20. If the temperature of the traction battery 20 is lower than a lower threshold, the controller 50 may activate the electric heater 102 to increase the temperature of the traction battery 20. The lower threshold may correspond to a lower limit of the desired or optimal temperature range. If the temperature of the traction battery 20 is greater than an upper threshold, the controller 50 may activate the thermoelectric cooler 106 to decrease the temperature of the traction battery 20. The upper threshold may correspond an upper limit of the desired or optimal temperature range. The lower and upper thresholds may also be referred to as first and second thresholds.

The controller 50 may be programmed to, by providing a command via an output channel 112, direct the M/G 18 to direct current generated during regenerative braking to either the electrically powered heating system or electrically powered cooling system (which may be collectively referred to as the heating and cooling system 100 or the electrically powered battery temperature conditioning system) in order heat or cool the traction battery 20. The controller 50 may include control logic and algorithms that are programmed into the controller 50. The control logic and algorithms may determine when to direct the current during regenerative braking to either the electrically powered heating system or electrically powered cooling system in order heat or cool the traction battery 20. The controller may include generating a command based on the control logic and algorithms to direct at least a portion of the current generated by regenerative braking to the electrically powered cooling system (in this case the current would be directed to the thermoelectric cooler 106) in response to the temperature of the battery traversing or being greater than an upper desired battery temperature threshold. The controller may further include generating a command, based on the control logic and algorithms, to direct at least a portion of the current generated by regenerative braking to the electrically powered heating system (in this case the current would be directed to the electric heater 102) in response to the temperature of the battery traversing or being less than a lower desired battery temperature threshold. The current that is directed form the M/G 18 during regenerative braking to the either the electrically powered cooling system or the electrically powered heating system may be a portion of the total regenerative braking power that exceeds a charging rate limit of the traction battery 20

By utilizing the otherwise wasted regenerative braking energy to heat or cool the battery to an optimal temperature range, the need to operate temperature controls during periods where there is no excess regenerative braking energy may be greatly reduced, avoiding the need to use energy that is not "free" for that purpose. Furthermore, by using the excess regenerative braking energy to condition the battery to accept additional charge, as opposed to using friction braking alone, wasteful use of the engine 14 for compression braking solely for the purpose of dissipating excess energy is avoided or reduced.

Figure 3:
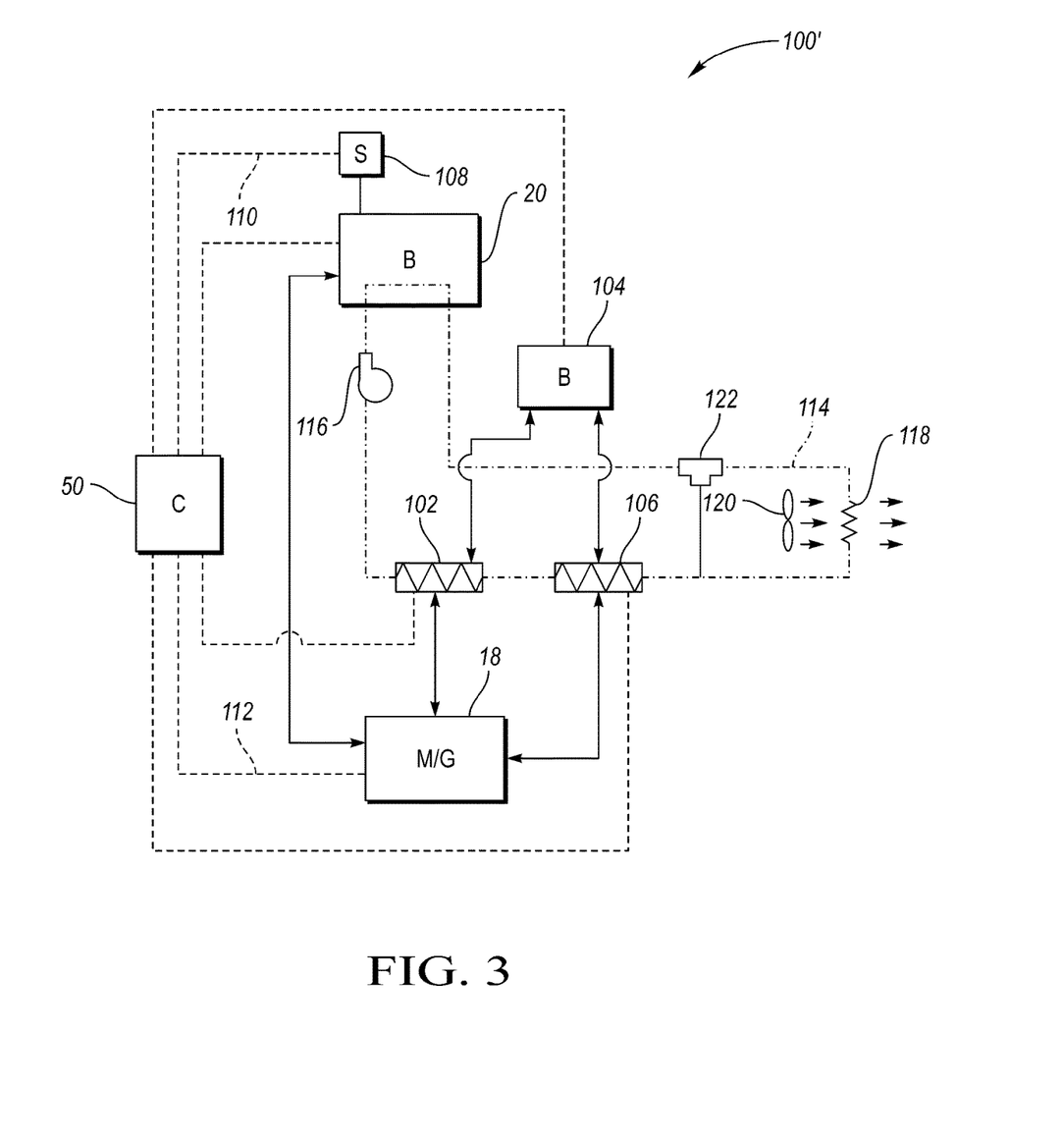
FIG. 3 is a schematic illustration of a second embodiment of an exemplary heating and cooling system of a battery in a hybrid electric vehicle.

Referring to FIG. 3, a schematic diagram of a second embodiment of an exemplary heating and cooling system 100' of a battery in a hybrid electric vehicle is illustrated. The second embodiment of the heating and cooling system 100' also includes the M/G 18, traction battery 20, controller 50, electric heater 102, accessory battery 104, thermoelectric cooler 106, temperature sensor 108, input channel 110, and output channel 112.

The second embodiment 100' includes a coolant loop 114 that is in fluid communication with the traction battery 20. The coolant loop 114 may be an independent system or part of another cooling system, such as the engine cooling system. The coolant loop 114 includes a pump 116 that is configured to cycle a coolant through the coolant loop 114. The coolant loop 114 may also include a heat exchanger 118 that is configured to remove heat from the coolant that is within the coolant loop 114. A fan 120 may be used to direct air across the heat exchanger 118 in order to remove excess heat from the coolant within the coolant loop 114. The coolant loop 114 may also include a valve or thermostat 122 that may be used to bypass the heat exchanger 118 when it is not desirable to remove excess heat from the coolant. The electric heater 102 and the thermoelectric cooler 106 may be configured to receive current generated by the M/G 18 during regenerative braking to heat or cool the coolant within the coolant loop 114 in order to maintain the optimal or desired temperature range of the traction battery 20. The controller 50 may maintain the optimal or desired temperature range of the traction battery 20 by controlling the electric heater 102 and the thermoelectric cooler 106 to heat or cool the coolant within the coolant loop in the same manner that the electric heater 102 and thermoelectric cooler 106 are controlled in the first embodiment of the heating and cooling system 100 to maintain the optimal or desired temperature range of the traction battery 20.

The second embodiment of the heating and cooling system 100' functions in the same manner as the first embodiment of the heating and cooling system 100 except for the differences described above. All of the components of the second embodiment of the heating and cooling system 100' that are common with the first embodiment of the heating and cooling system 100 should be construed to function in the same manners as described with regard to the first embodiment of the heating and cooling system 100.

Figure 4:
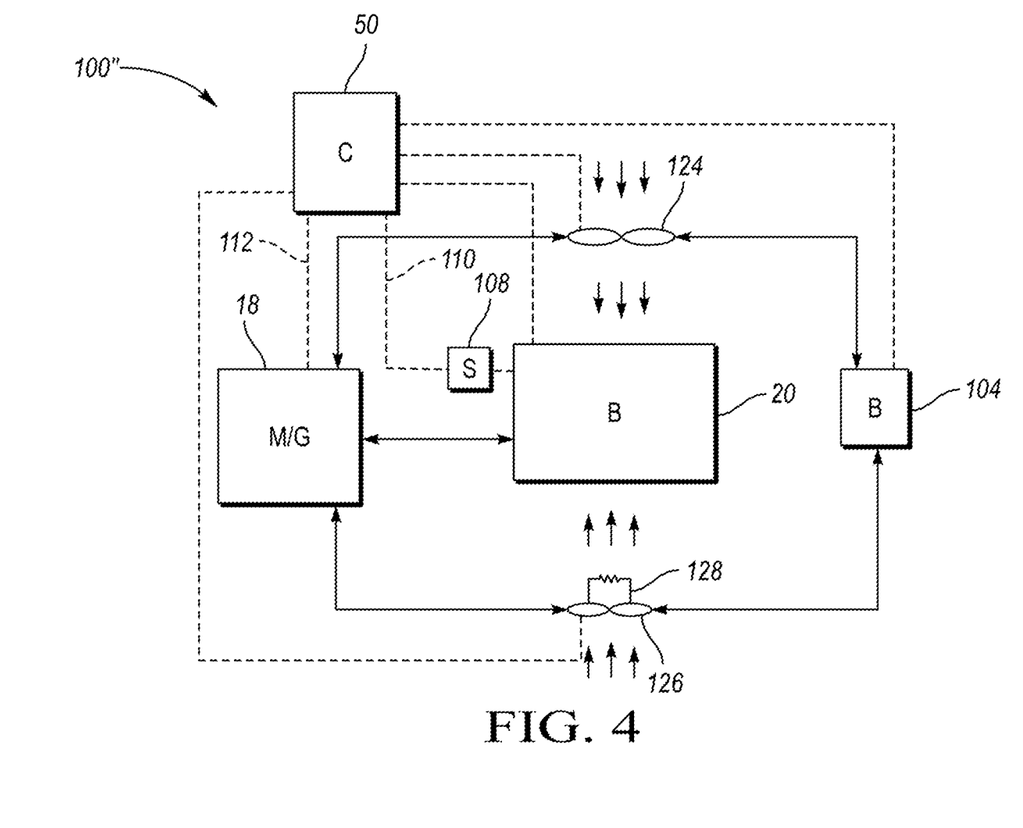
FIG. 4 is a schematic illustration of a third embodiment of an exemplary heating and cooling system of a battery in a hybrid electric vehicle.

Referring to FIG. 4, a schematic diagram of a third embodiment of an exemplary heating and cooling system 100" of a battery in a hybrid electric vehicle is illustrated. The third embodiment of the heating and cooling system 100" also includes the M/G 18, traction battery 20, controller 50, accessory battery 104, temperature sensor 108, input channel 110, and output channel 112.

The third embodiment 100" does not include the electric heater 102 or thermoelectric cooler 106, but however includes at least one fan to either heat or cool the traction battery 20 by directing air across the traction battery 20. In the described third embodiment, a first fan 124 is used to direct air across the traction battery 20 in order to cool the traction battery 20. The air directed by the first fan 124 may be the ambient air or the air from the vehicle cabin if the air is at a temperature sufficient enough to cool the traction battery 20. For example, if the first fan 124 is directing cabin air across traction battery 20, the cabin air may have been cooled by an air-conditioning system of the HEV 10. A second fan 126 may operate in conjunction with a resistive coil 128 in order to direct heated air across the traction battery 20 in order to heat the traction battery 20. The air directed by the second fan 126 may be the ambient air or the air from the vehicle cabin. The first fan 124, second fan 126, and resistive coil 128 may be configured to receive current generated by the M/G 18 during regenerative braking to heat or cool the traction battery 20 in order to maintain the optimal or desired temperature range of the traction battery 20. The controller 50 may maintain the optimal or desired temperature range of the traction battery 20 by controlling the first fan 124, second fan 126, and resistive coil 128 in the same manner that the electric heater 102 and thermoelectric cooler 106 are controlled in the first embodiment of the heating and cooling system 100 to maintain the optimal or desired temperature range of the traction battery 20.

The third embodiment of the heating and cooling system 100" functions in the same manner as the first embodiment of the heating and cooling system 100 except for the differences described above. All of the components of the third embodiment of the heating and cooling system 100" that are common with the first embodiment of the heating and cooling system 100 should be construed to function in the same manners as described with regard to the first embodiment of the heating and cooling system 100.

Figure 5:
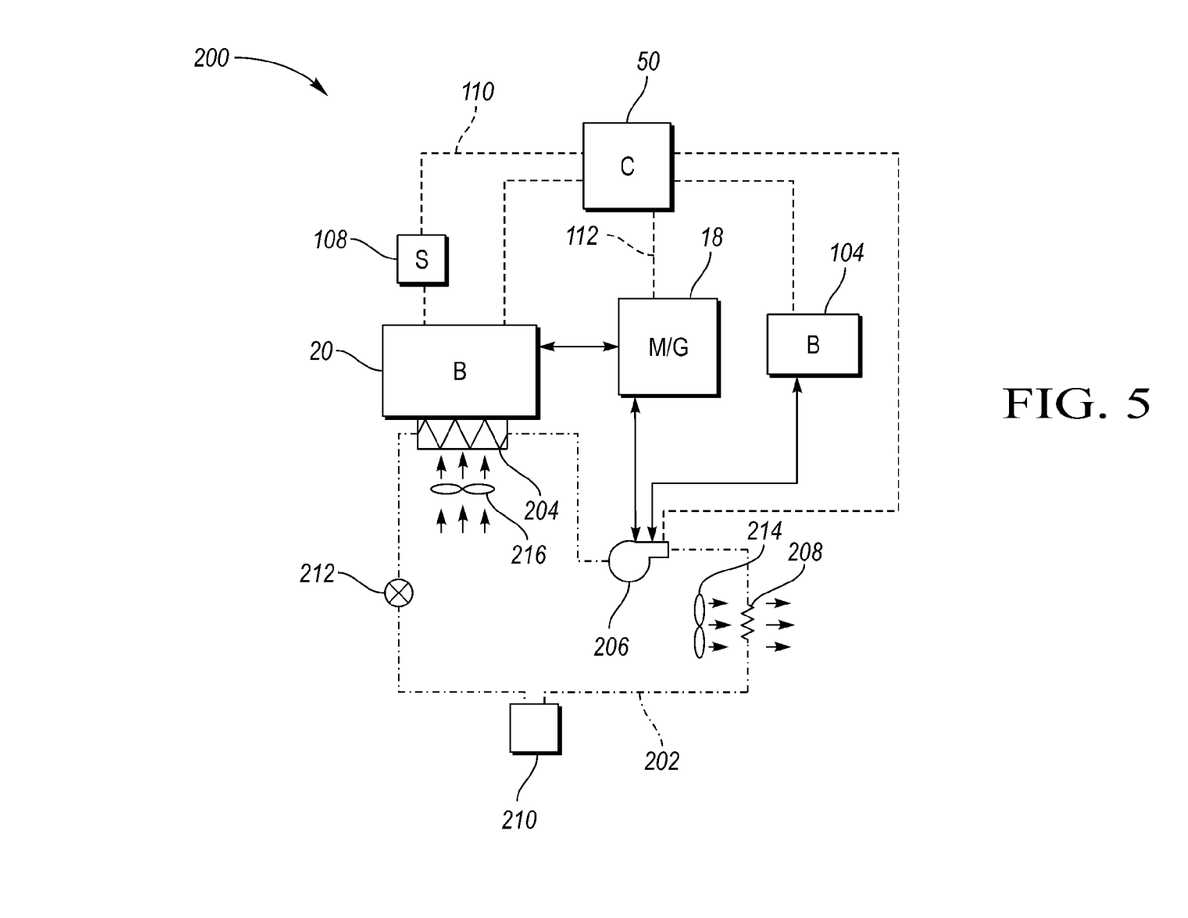
FIG. 5 is a schematic illustration of a fourth embodiment of an exemplary cooling system of a battery in a hybrid electric vehicle.

Referring to FIG. 5, a fourth embodiment of an exemplary cooling system 200 of a battery in a hybrid electric vehicle is illustrated. The fourth embodiment of the cooling system 200 also includes the M/G 18, traction battery 20, controller 50, accessory battery 104, temperature sensor 108, input channel 110, and output channel 112.

The fourth embodiment of the cooling system 200 differs from the other embodiments in that a refrigerant loop 202 is used cool the traction battery 20. The refrigerant loop 202 includes an evaporator 204 that is configured to cool the traction battery 20, a compressor 206 that is configured to cycle a refrigerant through the refrigerant loop 202, a condenser 208 that is configured to reject heat from the refrigerant loop 202 to the ambient surroundings, a receiver/dryer 210, and a thermal expansion valve 212. A first fan 214 may be used to direct air across the condenser 208 in order to reject heat from the refrigerant loop 202 to the ambient surroundings. A second fan 216 may be used to direct air across the evaporator 204 in order to cool the air. The cooled air may be then directed across the traction battery 20 in order to cool the traction battery 20. Alternatively, the evaporator 204 may directly contact the traction battery 20 in order to cool the traction battery 20. In yet another alternative, a cold plate or a series of thermally conductive fins may connect the evaporator 204 to the traction battery 20 in order to cool the traction battery 20. The compressor 206 may be configured to receive current generated by the M/G 18 during regenerative braking to operate the refrigerant loop 202 in order to cool the traction battery 20 such that the traction battery is within the desired temperature range. The controller 50 may maintain the optimal or desired temperature range of the traction battery 20 by controlling the compressor 206 in order to operate the refrigerant loop 202 in the same manner that the thermoelectric cooler 106 is controlled in the first embodiment of the heating and cooling system 100 to maintain the optimal or desired temperature range of traction battery 20.

The fourth embodiment of the cooling system 200 functions in the same manner as the cooling system in the first embodiment of the heating and cooling system 100 except for the differences described above. All of the components of the fourth embodiment of the cooling system 200 that are common with the first embodiment of the heating and cooling system 100 should be construed to function in the same manners as described with regard to the first embodiment of the heating and cooling system 100.

Figure 6:
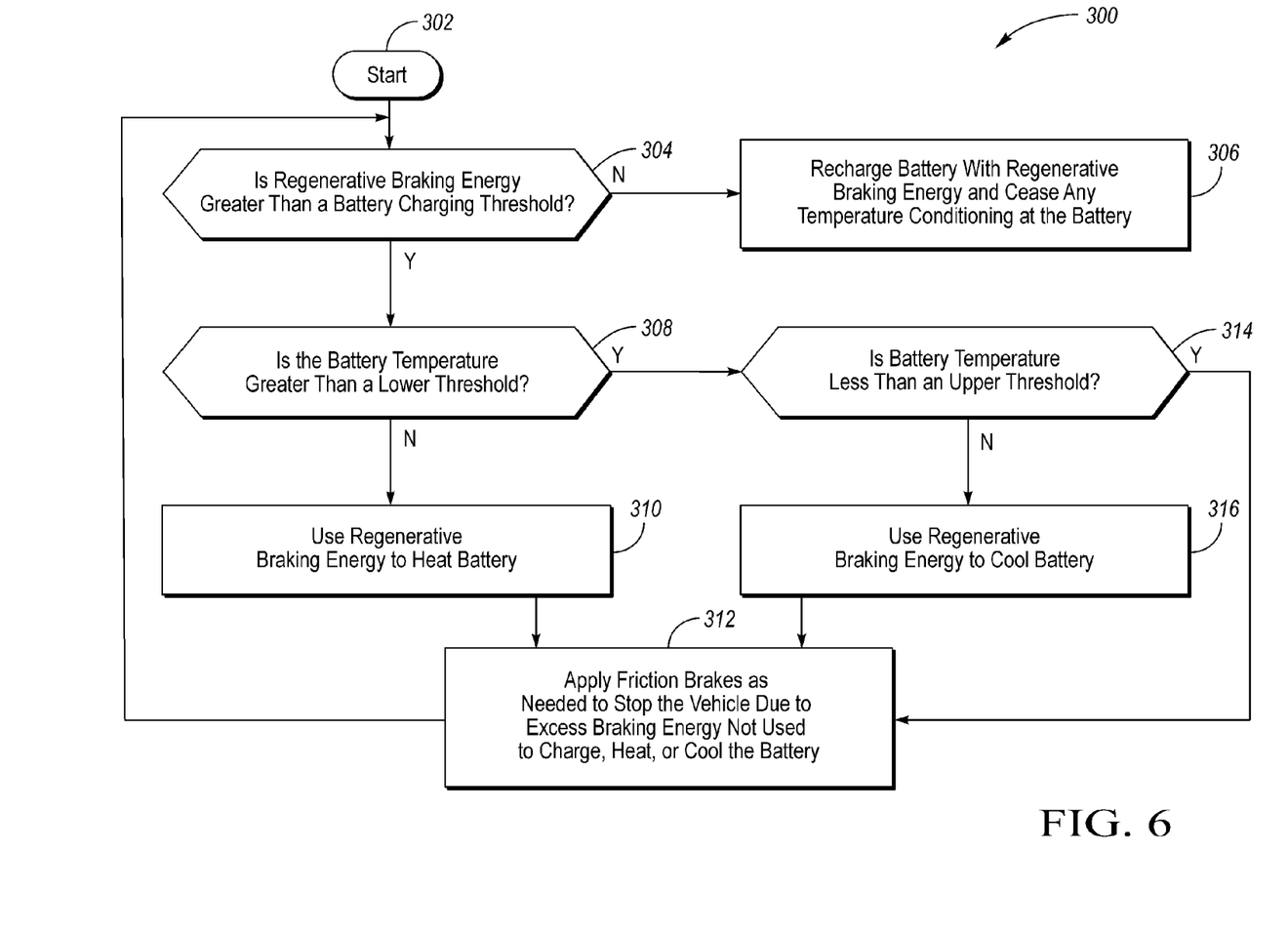
FIG. 6 is a method of utilizing regenerative braking power to operate an electrically powered battery temperature conditioning system of a hybrid electric vehicle.

Referring to FIG. 6, a method 300 of utilizing regenerative braking power to operate an electrically powered battery temperature conditioning system of a hybrid electric vehicle is illustrated. The method 300 is initiated at the start block 302. The method 300 may be initiated by placing a vehicle ignition into an "on" position, pressing a "start/run" button, placing the transmission of the HEV 10 into a specific gear selection, or by any other appropriate condition where the HEV 10 may potentially be generating power via the M/G 18 through regenerative braking.

After the method 300 is initiated at the start block 302, the method 300 moves on to step 304. At step 304 it is determined if the total regenerative braking energy being generated exceeds a battery charging threshold of the traction battery 20. The battery charging threshold may refer to a capacity of the traction battery 20 to receive charge or a charging rate limit of the traction battery 20. The charging rate limit of the traction battery 20 may be dictated by several factors, including the capacity of the traction battery 20 to receive charge, the capacity of the power electronics 56 to transport electricity, the maximum power of the M/G 18, or the maximum torque of the M/G 18. If the total regenerative braking energy does not exceed the charging threshold of the traction battery 20, the method 300 moves on to step 306 where the regenerative braking energy is directed to recharging the traction battery 20. If the method moves on to step 306, any temperature conditioning of the traction battery 20, if previously initiated, will cease. If the total regenerative braking power does exceed the charging threshold of the traction battery 20, the method 300 moves on to step 308.

At step 308 is determined if the temperature of the traction battery 20 is greater than a lower threshold. If the temperature of the traction battery 20 is not greater than the lower threshold, the method 300 moves on to step 310 where the regenerative braking energy is directed to an electrically powered heating system that is used to heat the traction battery 20. The method 300 then moves on to step 312, from step 310, where friction brakes of the HEV 10 are applied as needed to stop the HEV 10 due to excess braking energy not being used to either charge or heat the traction battery 20. The method 300 then returns step 304 and the process is repeated.

At step 310, electrical power being generated by the M/G 18 through regenerative braking is directed to power the electric heating system in order to heat the traction battery 20. The amount of regenerative braking power directed to power the electric heating system may correspond to a portion of the total regenerative braking power that exceeds the battery charging threshold of the traction battery 20.

Returning to step 308, if the temperature of the traction battery 20 is greater than the lower threshold, the method 300 moves on to step 314 where it is determined if the temperature of the traction battery 20 is less than an upper threshold. If the temperature of the traction battery 20 is not less than the upper threshold, the method 300 moves on to step 316 were the regenerative braking energy is directed to an electrically powered cooling system that is used to cool the traction battery 20. The method 300 then moves on to step 312, from step 316, where friction brakes of the HEV 10 are applied as needed to stop the HEV 10 due to excess braking energy not being used to either charge or cool the traction battery 20. The method 300 then returns step 304 and the process is repeated.

At step 316, electrical power being generated by the M/G 18 through regenerative braking is directed to power the electric cooling system in order to cool the traction battery 20. The amount of regenerative braking power directed to power the electric cooling system may correspond to a portion of the total regenerative braking power that exceeds the battery charging threshold of the traction battery 20.

Returning to step 314, if the temperature of the traction battery is less than the upper threshold, the method 300 moves on to step 312, from step 314, where friction brakes of the HEV 10 are applied as needed to stop the HEV due to excess braking energy not being used to charge the traction battery 20. The method 300 then returns to step 304 and the process is repeated.

It should be understood that the hybrid vehicle configuration in FIG. 1 is merely exemplary and is not intended to be limited. The schematics of FIGS. 2-5 and the method of FIG. 6 may be applicable to other hybrid vehicle configurations, which should be construed as disclosed herein. Other hybrid and electric vehicle configurations should be construed as disclosed herein including series hybrid vehicles, parallel hybrid vehicles, series-parallel hybrid vehicles, power-split hybrid vehicles, plug-in hybrid electric vehicles (PHEVs), fuel cell hybrid vehicles, battery operated electric vehicles (BEVs), or any other hybrid or electric vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a battery;
   an electric machine configured to charge the battery with current generated from regenerative braking;
   an electrically powered cooling system includes a refrigerant loop having an electric compressor and is configured to cool the battery; and
   a controller programmed to, in response to a temperature of the battery being greater than a first threshold, direct at least a portion of the current generated from regenerative braking to the compressor.

2. The vehicle of claim 1, wherein the first threshold corresponds to an upper limit of a desired battery temperature range for battery charging.

3. The vehicle of claim 1, wherein the cooling system includes a thermoelectric cooler configured to receive at least a portion of the current generated from regenerative braking.

4. The vehicle of claim 1, wherein the cooling system includes an electric fan configured to receive at least a portion of the current generated from regenerative braking and direct air across the battery.

5. The vehicle of claim 1 further comprising an electric heater configured to heat the battery, wherein the controller is programmed to, in response to the temperature of the battery being less than a second threshold, direct at least a portion of the current generated from regenerative braking to the electric heater.

6. The vehicle of claim 5, wherein the second threshold corresponds to a lower limit of a desired battery temperature range for battery charging.

7. The vehicle of claim 5 further comprising a coolant loop in fluid communication with the battery, wherein the electric heater is configured to heat a coolant within the coolant loop.

8. A vehicle comprising:
   a battery;
   an electric machine configured to charge the battery with current generated from regenerative braking;
   an electric heater configured to heat a coolant within a coolant loop that is in fluid communication with the battery; and
   a controller programmed to, in response to a temperature of the battery being less than a first threshold, direct at least a portion of the current generated from regenerative braking to the electric heater.

9. The vehicle of claim 8, wherein the first threshold corresponds to a lower limit of a desired battery temperature range for battery charging.

10. The vehicle of claim 8, wherein the electric heater includes a resistive coil configured to heat air and a fan configured to direct the heated air across the battery.

11. The vehicle of claim 8 further comprising an electric cooling system configured to cool the battery, wherein the controller is programmed to, in response to the temperature of the battery being greater than a second threshold, direct at least a portion of the current generated from regenerative braking to the cooling system.

12. The vehicle of claim 11, wherein the second threshold corresponds to an upper limit of a desired battery temperature range for battery charging.

13. The vehicle of claim 11, wherein the cooling system includes a thermoelectric cooler configured to receive the current generated from regenerative braking.

14. The vehicle of claim 11, wherein the cooling system includes a refrigerant loop having an electric compressor configured to receive the current generated from regenerative braking.

15. The vehicle of claim 11, wherein the cooling system includes an electric fan configured to receive the current generated from regenerative braking and direct air across the battery.

16. A vehicle comprising:
   a battery;
   an electric machine configured to charge the battery with current generated from regenerative braking;
   an electrically powered cooling system including an electric fan configured to direct air across the battery; and
   a controller programmed to, in response to a temperature of the battery being greater than a first threshold, direct at least a portion of the current generated from regenerative braking to the fan.

* * * * *